US010518242B2

(12) United States Patent
Van Cauwenberge et al.

(10) Patent No.: US 10,518,242 B2
(45) Date of Patent: Dec. 31, 2019

(54) REACTOR FOR A CRACKING FURNACE

(71) Applicants: BASF ANTWERPEN NV, Antwerp (BE); UNIVERSITEIT GENT, Ghent (BE); BASF SE, Ludwigshafen (BE)

(72) Inventors: David J. Van Cauwenberge, Ghent (BE); Kevin M. Van Geem, De Pinte (BE); Jens Floré, Zwijndrecht (BE); Guy B. Marin, Ghent (BE); Heinrich Laib, Limburgerhof (DE)

(73) Assignees: BASF SE (DE); Universiteit Gent (BE); BASF Antwerpen N.V. (BE)

( * ) Notice: Subject to any disclaimer, the term of this patent is extended or adjusted under 35 U.S.C. 154(b) by 0 days.

(21) Appl. No.: 16/081,501

(22) PCT Filed: Apr. 12, 2017

(86) PCT No.: PCT/EP2017/058850
§ 371 (c)(1),
(2) Date: Aug. 31, 2018

(87) PCT Pub. No.: WO2017/178551
PCT Pub. Date: Oct. 19, 2017

(65) Prior Publication Data
US 2019/0070579 A1    Mar. 7, 2019

(30) Foreign Application Priority Data

Apr. 12, 2016  (EP) .................................. 16164921

(51) Int. Cl.
*B01J 19/20*  (2006.01)
*B01J 19/24*  (2006.01)
(Continued)

(52) U.S. Cl.
CPC ........ *B01J 19/2425* (2013.01); *B01J 12/007* (2013.01); *B01J 15/005* (2013.01);
(Continued)

(58) Field of Classification Search
CPC .............................. B01J 19/2425; B01J 19/20
(Continued)

(56) References Cited

U.S. PATENT DOCUMENTS 3,231,014 A    1/1966 Koenig
5,206,880 A    4/1993 Olsson
(Continued)

FOREIGN PATENT DOCUMENTS

| EP | 0679812 A4 * | 6/1995 | .............. F28F 13/02 |
|----|----|----|----|
| GB | 969796 A | 9/1964 | |
| JP | S6211797 A | 1/1987 | |

OTHER PUBLICATIONS

PCT International Search Report and Written Opinion dated Jul. 21, 2017 for PCT International Patent Application No. PCT/EP2017/058850, 11 pages.
(Continued)

*Primary Examiner* — Huy Tram Nguyen
(74) *Attorney, Agent, or Firm* — Drinker Biddle & Reath LLP (57) ABSTRACT

The invention relates to a reactor for cracking hydrocarbons wherein the reactor has inner wall; characterized in that the inner wall comprises a plurality of concave dimples embedded in a surface of said inner wall.

20 Claims, 7 Drawing Sheets

(51) Int. Cl.
    *C10G 9/20*     (2006.01)
    *B01J 12/00*     (2006.01)
    *B01J 15/00*     (2006.01)
    *B01J 19/00*     (2006.01)

(52) U.S. Cl.
    CPC ....... *B01J 19/0053* (2013.01); *B01J 19/2415* (2013.01); *C10G 9/20* (2013.01); *B01J 2219/00157* (2013.01); *B01J 2219/00247* (2013.01)

(58) Field of Classification Search
    USPC .......................................................... 422/129
    See application file for complete search history.

(56) References Cited

U.S. PATENT DOCUMENTS 5,950,718 A     9/1999    Sugitani et al.
2004/0047794 A1    3/2004    Pfaffelhuber et al.
2005/0131263 A1    6/2005    Wolpert et al.
2007/0028860 A1    2/2007    Hemsath
2007/0163757 A1    7/2007    Kiknadze et al.
2014/0166252 A1    6/2014    Cur et al.
2018/0195008 A1    7/2018    Rampure et al.

OTHER PUBLICATIONS

PCT Notification of Transmittal of the International Preliminary Report on Patentability dated May 8, 2018 for PCT Patent International Application No. PCT/EP2017/058850, 17 pages.

Office of Industrial Technologies Energy Efficiency and Renewable Energy: "Enhanced Heat Exchangers for Process Heaters," Nov. 2001, pp. 1-2, retrieved from the internet: URL:http://www1.eere.energy.gov/manufacturing/resources/chemicals/pdfs/processheaters.pdf.

* cited by examiner

REACTOR FOR A CRACKING FURNACE

CROSS-REFERENCE TO RELATED APPLICATIONS

This application is a U.S. national stage entry under 35 U.S.C. § 371 of PCT International Patent Application No. PCT/EP2017/058850, filed Apr. 12, 2017, which claims priority to European Patent Application No. 16164921.5, filed Apr. 12, 2016, the contents of which are incorporated herein by reference in their entirety.

FIELD OF THE INVENTION

Provided herein is a reactor for cracking hydrocarbons, a furnace comprising the reactor for cracking hydrocarbons, and a method for producing light olefins from a hydrocarbon feedstock.

BACKGROUND TO THE INVENTION

In the petrochemical industry, smaller olefins are often produced from a precursor feedstock by a thermal cracking process. This cracking process involves heating up a precursor feedstock comprising larger hydrocarbons. As a result of the increased thermal energy, carbon bonds present in the precursors feedstock will be broken, thereby turning the long-chains of hydrocarbon molecules into shorter, smaller ones. The necessary temperatures to initiate the cracking process may reach up to a thousand degrees, depending on the supplied hydrocarbon and the desired cracked end-product. Usually, other cracking process conditions such as residence time, dilution, flow, pressure, etc., may be tuned to achieve the highest possible yield.

Commonly, the steam cracking process takes place inside a reactor suspended in a large, gas-fired furnace which heats up the reactor from the outside. Often tens to hundreds of these reactors are stacked together in one furnace to increase production capacities up to several thousand kilotons per year (kta). These reactors, sometimes called cracking tubes, are fabricated in many different shapes and sizes in an effort to increase the capacity, improve the selectivity, yield, and/or thermal efficiency of the process.

During steam cracking the precursor feedstock supplied in gas-state flows to the reactor at a high velocity where it is diluted with steam and heated without the presence of oxygen. However, as a result of this process a deposition of coke, i.e., a solid residue composed of carbon, may build up on the inner wall of the reactor. This deposition of coke has several adverse effects on the productivity of these reactors:
(1) Coke has a low thermal conductivity, so deposition of coke may lower the thermal efficiency of the system which will in turn require the fuel flow rate to be increased to maintain the same level of production, thus further increasing the coke deposition rate.

Moreover, different coke deposition rates across a series of reactors suspended in a common furnace will prevent proper temperature control needed to maintain desired production selectivity. The low thermal conductivity of the cokes layer also results in higher tube metal temperatures, which may reach the design limits of the alloy that is used.
(2) Sustained deposition of coke may decrease the cross-sectional area of a reactor available for the feedstock gas resulting in a higher process gas velocity and a higher pressure drop over the reactor. To compensate for this pressure drop, the overall pressure inside the reactor will have to be increased, which inadvertently leads to reduced process selectivity towards light olefins because of an increased rate of secondary reactions between those olefins.
(3) Presence of coke decreases the carbon yield of the cracking process since all the carbon atoms that would otherwise be collected as light olefins are instead incorporated into the coke and are hence lost.

To limit the adverse effects of coke deposition over time a regular shutdown is required to decoke the reactors. The decoking process typically involves taking a whole furnace offline for 1 or more days to oxidize coke depositions and remove them from the inner wall of all the reactors. Consequently, a decoking process drastically decreases the productivity of a furnace by interrupting the run-length and increases the production costs, by stacking material and energy costs needed to perform the decoking process and thereafter restart the cracking process. Furthermore, given the exothermic nature of decoking, thermal damage may occur to the reactors during decoking.

Internal fins such as described in GB969796 may achieve improved heat transfer by increasing the internal surface area. As the exposed reactor surface area increases, however, so does the laminar flow layer in contact with the reactor wall. In this layer, high residence times are coupled with high temperatures, giving rise to significant losses of valuable product yields. Additionally, more of the reactor wall is exposed for formation of coke deposits. Hence, while the thermal performance of the tubes may be improved, the effect on coke formation and run lengths can even be negative.

U.S. Pat. No. 5,950,718 aims to resolve these issues by adding convex elements to the reactor wall in order to break up the laminar layer and promote turbulent mixing. While such devices may improve heat transfer coefficient, they typically suffer from excessive drag, as potential energy in the form of pressure is transformed into turbulent kinetic energy. Additionally, such obstructions in the flow induce recirculating flow patterns with locally high residence times which are prone to coke formation. The separate welding of each of the elements also adds an additional maintenance risk, as elements can break off because of the high local thermal and shear stresses they are exposed to.

Accordingly, there is a need for new technologies that allow for an increase of the run-lengths of steam cracking reactors and furnaces. There is also a need for technologies that aim to improve the olefin selectivity during the thermochemical process. There is also a need for technologies that aim to improve heat transfer. There is also a need for technologies that aim to decrease thermal stress. There is also a need for technologies that aim to operate at a higher severity by increasing the maximal process gas temperature. There is also a need for technologies that aim to operate at a higher throughput by increasing the maximum load. There is also a need for technologies that aim to limit the occurrence and/or magnitude of a pressure drop.

SUMMARY OF THE INVENTION

The invention as described herein provides an answer to one or more of the above-mentioned needs. Preferred embodiments of the invention as described herein provide an answer one or more of the above-mentioned needs.

According to a first aspect, the invention relates to a reactor for cracking hydrocarbons wherein the reactor has an inner wall; characterized in that the inner wall comprises a plurality of concave dimples embedded in a surface of said inner wall. Preferably, the reactor is a pyrolysis, thermal cracking, or steam cracking reactor.

In some preferred embodiments, each concave dimple of the plurality of concave dimples is characterized by a dimple depth e, wherein e is at least 0.01 cm and at most 1.0 cm, preferably at least 0.1 cm and at most 0.5 cm.

In some preferred embodiments, each concave dimple of the plurality of concave dimples is characterized by a dimple diameter d, wherein d is at least 0.1 cm and at most 5.0 cm, preferably at least 0.5 cm and at most 2.0 cm.

In some preferred embodiments, each concave dimple of the plurality of concave dimples is further characterized by a depth-to-diameter ratio (DDR), defined as $$DDR=e/d;$$

wherein the DDR is at least 0.01 and at most 0.5, preferably at least 0.05 and at most 0.4; more preferably at least 0.1 and at most 0.3.

In some preferred embodiments, the shape of each dimple of the plurality of concave dimples is characterized by a geometrical feature, preferably by a smooth or curved edge, for example, at least a section of a sphere, a spheroid, an ovoid or a teardrop shape.

Figure 3:
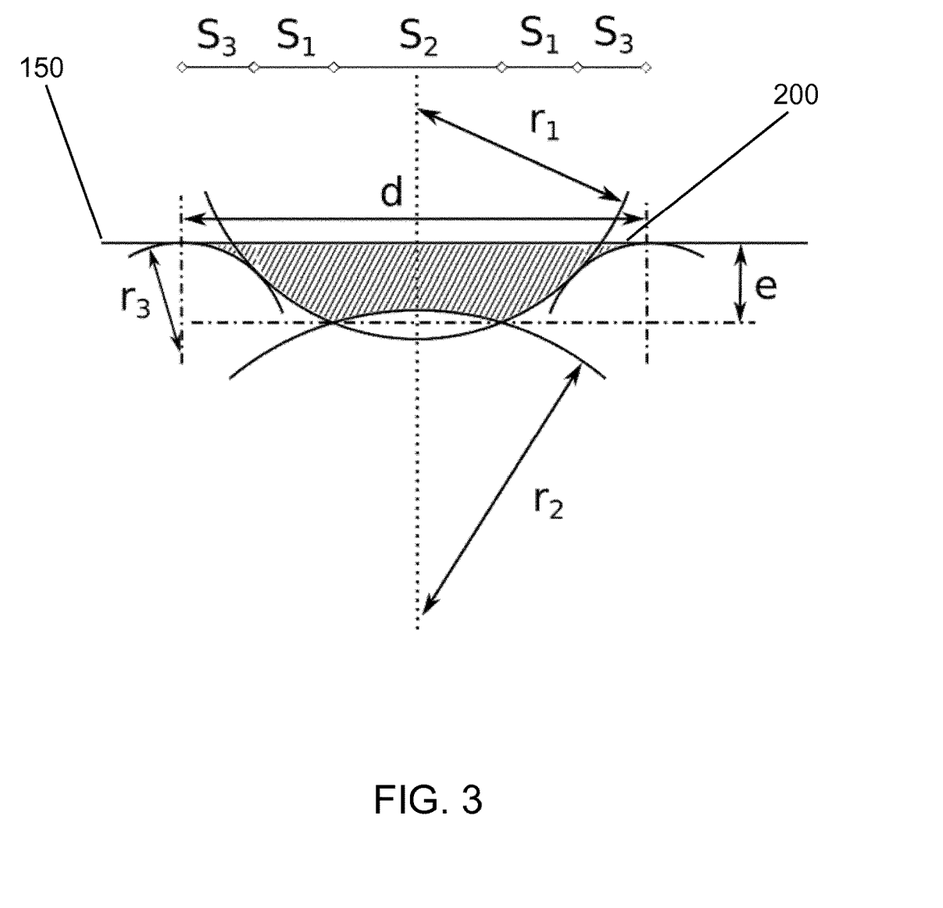
FIG. 3 illustrates the design of a dimple with potentially reduced pressure losses through application of three concentric curvature regions S1, S2 and S3 with respective curvature $1/r_1$, $-1/r_2$ and $-1/r_3$. In this case the dimple depth e and diameter d can be calculated as being the extreme values of the final dimple shape.

In some preferred embodiments, at least one dimple of the plurality of dimples further comprises two or more secondary curvature areas of a different curvature radius than the main concavity, wherein the secondary curvature areas are situated on the edge of, or within the main concavity. FIG. 3 exemplifies such secondary curvature areas.

In some preferred embodiments, at least a portion of the plurality of concave dimples is arranged in one or more patterns, preferably wherein the pattern is linear, staggered, and/or crossed.

In some preferred embodiments, at least a portion of the inner wall is smooth, i.e., not covered by any concave dimples, further characterized by an area coverage (AC) defined as $$AC\ (\%)=\text{total area of the inner wall covered by dimples/total area of the inner wall}*100;$$

wherein the AC is at least 1% and at most 99%, preferably at least 20% and at most 90%.

In some preferred embodiments, the reactor has a tubular shape and is characterized by:
- a total reactor length of at least 10 m to at most 400 m;
- an inner diameter of at least 2 cm to at most 20 cm, preferably at least 3 cm and at most 15 cm;
- an outer diameter, larger than the inner diameter, of at least 3.0 cm and at most 22.0 cm, preferably at least 5.0 cm and at most 17.0 cm; and
- a wall thickness, defined as half the difference between the outer diameter and the inner diameter, of at least 0.3 cm and at most 2.0 cm, preferably at least 0.5 cm and at most 1 cm.

In some preferred embodiments, the wall thickness is greater than twice the dimple depth e (2*e), preferably wherein the wall thickness is greater than 3*e. Typically the wall thickness is always greater than the dimple depth e.

In some preferred embodiments, the inner wall comprises a metal, a metal alloy, a ceramic, and/or a combination thereof.

In some preferred embodiments, each dimple of the plurality of concave dimples comprises the same material as the reactor.

According to a second aspect, the invention relates to a furnace, comprising a reactor according to the first aspect of the invention, and preferred embodiments thereof.

According to a third aspect, the invention relates to a method for producing a reactor according to the first aspect of the invention, and preferred embodiments thereof, the method comprising one of the following steps:
- moulding;
- centrifugal casting;
- excavation; and/or
- deposition.

According to a fourth aspect, the invention relates to a method for producing light olefins in a reactor according to the first aspect of the invention, and preferred embodiments thereof, or in a furnace according to the second aspect of the invention, and preferred embodiments thereof, the method comprising the step of cracking a hydrocarbon feedstock into light olefins at a temperature of at least 700° C. and at most 900° C.

FIGURE LEGENDS

The following numbering refers to: (100) reactor—for pyrolysis, thermal cracking, or steam cracking; (150) reactor inner wall—surface; (200) dimple—concave.

FIG. 7(*a*) is a plot of the streamlines on a dimpled surface with dimple depth-to-diameter ratio of 0.45, obtained using the time-averaged large eddy simulation data between t=1.8 s and t=2.0 s.; described further in Example 5.

DETAILED DESCRIPTION OF INVENTION

Before the present system and method of the invention are described, it is to be understood that this invention is not limited to particular systems and methods or combinations described, since such systems and methods and combinations may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise. The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all numbers and fractions subsumed within the respective ranges, as well as the recited endpoints. The term "about" or "approximately" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" or "approximately" refers is itself also specifically, and preferably, disclosed.

Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any ≥3, ≥4, ≥5, ≥6 or ≥7 etc. of said members, and up to all said members.

All references cited in the present specification are hereby incorporated by reference in their entirety. In particular, the teachings of all references herein specifically referred to are incorporated by reference.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different aspects of the invention are defined in more detail. Each aspect so defined may be combined with any other aspect or aspects unless clearly indicated to the contrary. In particular, any feature or embodiment indicated as being preferred or advantageous may be combined with any other feature or embodiment indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

In the present description of the invention, reference is made to the accompanying drawings that form a part hereof, and in which are shown by way of illustration only of specific embodiments in which the invention may be practiced. Parenthesized or emboldened reference numerals affixed to respective elements merely exemplify the elements by way of example, with which it is not intended to limit the respective elements. It is to be understood that other embodiments may be utilised and structural or logical changes may be made without departing from the scope of the present invention. The following detailed description, therefore, is not to be taken in a limiting sense, and the scope of the present invention is defined by the appended claims.

The term "steam cracking process" refers to a chemical reaction wherein one or more carbon bonds contained within a precursor feedstock are broken by thermal energy to split the large molecules of a precursor feedstock into shorter, preferably unsaturated molecules of a product. The term "pyrolysis" refers to a thermochemical decomposition of organic material at elevated temperatures in the absence of oxygen (or any halogen); it is a form of thermolysis and comprises any terms which may be considered related or synonymous by those skilled in the art. More details on steam cracking may be found in Zimmermann, H.; Walzl, R., Ethylene. In Ullmann's Encyclopedia of Industrial Chemistry, Wiley-VCH Verlag GmbH & Co. KGaA: 2000; pp 469-493, which is hereby incorporated in its entirety by reference.

The term "precursor feedstock" refers to a group of organic compounds which are supplied to the reactor where they undergo a thermochemical decomposition to be transformed into a product; preferably the precursor feedstock comprises hydrocarbons that are split into (light) olefins by a steam cracking process. Examples of suitable precursor feedstock may be selected from the group comprising: ethane, propane, butane, LPG, (renewable) naphtha, light gas oil, vacuum gas oil, gas condensates up to, (hydrotreated) crude oil, and so on, and/or co-cracking of combinations thereof. Any feedstock exhibiting coking (depositions) would particularly benefit from the present invention.

The term "product" refers to a group of organic compounds that are obtained from the reactor after a thermochemical reaction has transformed the precursor feedstock. Preferably the product comprises (light) olefins obtained from hydrocarbons broken by a steam cracking process. Examples of desired product may be selected from the group comprising: ethylene, propylene, benzene, butadiene, and so on, and/or combinations thereof.

The term "reactor" as used herein refers to a device or structure according to the present invention for containing a chemical reaction; preferably said chemical reaction involves steam cracking for olefin production. The term "inner wall" as used herein refers to the surface area comprised within the reactor structure; preferably in contact with the space wherein a chemical reaction takes place. The term "outer wall" as used herein refers to the surface area comprised outside the reactor structure; preferably with the space wherefrom thermal energy is supplied to the reactor. Examples of varying shapes of reactor tubes may be found in van Goethem, M. W. M.; Jelsma, E., Numerical and experimental study of enhanced heat transfer and pressure drop for high temperature applications. Chem. Eng. Res. Des. 2014, 92 (4), 663-671, which is hereby incorporated in its entirety by reference.

The term "furnace" as used herein, also known as "oven", refers to a device or structure comprising one or more reactors according to the present invention for containing a chemical reaction; preferably said chemical reaction involves steam cracking for olefin production. The furnace is adapted to be suitable for (very) high-temperature heating. The general structure of a furnace is known in the art and may further comprise one or more structures configured for heating and heat distribution; for example, heating place or fireplace, a chimney, connector pipes, and so on. More details on furnace designs suitable for steam cracking may be found in Zimmermann, H.; Walzl, R., Ethylene. In Ullmann's Encyclopedia of Industrial Chemistry, Wiley-VCH Verlag GmbH & Co. KGaA: 2000; pp 482-491, which is hereby incorporated in its entirety by reference.

The term "dimple" as used herein refers to a concave depression in the surface of an inner wall of a reactor; preferably wherein the dimple is a concave depression; preferably wherein the dimple is hollow with regards to the inner area of a reactor. The term "concave" as used herein refers to a surface area that curves inwards like the interior of a sphere or spheroid; it comprises the terms recessed, indented, inward, and so on. The term "pattern" as used herein refers to an ordered arrangement of dimples in a regular and repeated format distinguishable by a model or a design.

The Reynolds number (Re) is defined as the ratio of momentum (or inertial) forces to viscous forces, and thus consequently quantifies the relative importance of these two types of forces for given flow conditions. The momentum forces can be related to the flow velocity and a length scale. In the case of a cylindrical tube, this leads to the following definition: $Re = uD/v$, with $v$ the kinematic viscosity.

According to a first aspect, the invention encompasses a reactor for cracking hydrocarbons wherein the reactor has an inner wall; characterized in that the inner wall comprises a plurality of concave dimples embedded in a surface of said inner wall. Preferably, all dimples are concave. Preferably, the reactor is a pyrolysis, thermal cracking, or steam cracking reactor. In some embodiments, the reactor is a thermochemical reactor. In some embodiments, the reactor is a reactor for thermolysis, more preferably a reactor for pyrolysis. In the most preferred embodiments the reactor is a steam cracking reactor.

Preferably, the reactor wall is essentially free of catalyst, preferably free of catalyst position within the reactor. For example, in a reforming reactor, the reactor will typically comprise catalyst positioned within the reactor. A pyrolysis, thermal cracking, or steam cracking reactor is usually free from having catalyst inside the reactor. However, the wall itself may comprise elements that have catalytic activity.

Preferably, the reactor is configured to withstand temperatures of 700-1200° C. A pyrolysis, thermal cracking, or steam cracking reactor is usually configured to withstand such temperatures. For example the reactor may be built from CrNi+steel, Cr+steel, or Al alloys.

Preferably, the reactor comprises a decoking system. Suitable decoking systems may be found in US20130239999A1 in paragraphs [0008] and [0009]. These paragraphs are hereby incorporated by reference. Suitable decoking systems may also be found in WO2016032730A, paragraph [0006]. This paragraph is hereby incorporated by reference.

In some embodiments, the decoking system comprises an air inlet and/or outlet. In some embodiments, the decoking system comprises a steam inlet and/or outlet. In some embodiments, the decoking systems comprises an air inlet and a steam inlet, preferably also an air outlet and a steam outlet. The outlet may release air and/or steam into the atmosphere.

The reactor comprises a reactor wall that partly seals of the "inside area" from the "outside area"; preferably, a reactor wall has at least an entry point and an exit point which allow a flow of molecules to pass through the reactor. The entry point through which the precursor feedstock is supplied to the reactor is hereby referred to as the "entry", and the exit point through which the product is extracted and/or collected is hereby referred to as the "exit". A reactor may consist of a plurality of entry points for each exit point. The reactor walls connected to these entry points are then joined by one or multiple manifold structures at one or more locations downstream of the entry points.

In some embodiments, the reactor has an inner wall which is connected in space with the inside area of the reactor; preferably the inside area is the space where a thermochemical reaction takes place; more preferably is the space where steam cracking is performed. In some embodiments, the reactor has an outer wall which is connected in space with the outside area of the reactor; preferably the outside area is the space wherefrom energy is supplied to the reactor; more preferably the energy is supplied in the form of heat; most preferably the energy is supplied in the form of heat by a furnace.

Preferably, the inner wall comprises a plurality of concave dimples. In some embodiments, the reactor inner wall comprises a plurality of hollow dimples; preferably the dimples are recessed inward into the inner wall; most preferably the dimples are concave. In some embodiments, the reactor inner wall is characterized in that the inner wall comprises a plurality of concave dimples embedded in the surface of said inner wall; preferably the dimples form a part of the inner wall surface.

In some embodiments, the reactor is characterized in that the inner wall comprises a plurality of concave dimples embedded in a surface of said inner wall By providing dimples inside the inner wall of a reactor several advantages are gained, such as an enhanced heat transfer and a reduced deposition rate. By enhancing the heat transfer in a reactor it may be possible to operate at a higher severity, i.e., temperature, which may allow a higher ethylene and total olefin selectivity, while maintaining the same throughput and run length; and/or operate at an increased load, which may allow more throughput for the same run length and severity. Additionally, by reducing the coke deposition rate it may be possible to increase the run lengths for a reactor thereby increasing the productivity of a reactor, increase the cost and energy efficiency of steam cracking, and obtain a higher yield rate by lowering the loss of carbon into deposited coke. Additionally, by enhancing the heat transfer in a reactor it may be possible to operate at reduced reactor wall temperatures thereby decreasing carburisation and increasing the life time of the reactor material.

As demonstrated in the examples, a secondary flow pattern is generated by the dimples, which aids the removal of coke. This flow pattern is characterized by entrainment of the process gas into the dimple by means of a suction force, due to the generation of a low pressure zone inside the cavity. Additionally, a rotating flow is generated inside the cavity, after which the hot process gas is ejected again towards the core of the tube. This ejected fluid may leave the dimple in a direction tangentially to the main flow, enhancing both radial and tangential mixing of the process gas (FIG. 7). In this manner, the existence of zones with high local residence times and temperatures may be avoided, as fluid is continuously ejected. This improved distribution of residence times can be expected to result in improved product yields, as demonstrated by Example 4.

The described pattern may also exhibit an oscillatory motion. This implies that while the mean flow follows the axial direction, the fluid near the reactor wall has a tangential component that shifts direction at steady intervals in a self-sustained manner. The shifting of the flow direction can have important implications for the fouling in these reactors. As the direction of the shear on the surface will continuously change, it is expected that any coke formed on the walls will break off more easily because of the dimples. In this manner, the dimpled embodiment is expected to exhibit a "self-cleaning" effect. This was demonstrated in Example 5, from which it can be seen that the surface parameters play an important role in obtaining this preferred flow pattern.

In some embodiments, the reactor is a thermochemical reactor. In some embodiments, the reactor is a reactor for thermolysis, more preferably a reactor for pyrolysis. In the most preferred embodiments the reactor is a steam cracking reactor.

In some embodiments, each dimple is characterized by a dimple depth $e$ and a dimple diameter $d$. Preferably, each dimple of the plurality of concave dimples is characterized by a dimple depth $e$ and a dimple diameter $d$. The subset of dimples from a plurality of dimples that share an equal dimple depth $e$ are hereby referred to as dimples with "common dimple depth". The subset of dimples from a plurality of dimples that share an equal dimple diameter $d$ are hereby referred to as dimples with "common dimple diameter".

The dimple depth $e$ is measured as the distance between the cylindrical inner wall surface and a deepest point inside said dimple furthest away from the cylindrical surface; preferably the deepest point coincides with the centre of a dimple, but it need not be, should any secondary structure be situated within the dimple. In some embodiments, the dimple depth $e$ is at least 0.01 cm and at most 1.0 cm, preferably at least 0.05 cm and at most 0.8 cm, most preferably at least 0.1 cm and at most 0.5 cm.

The dimple diameter $d$ is measured as the maximal distance between two antipodal points of the dimple, i.e., diametrically opposite points, lying on the edge of a dimple running as a straight line segment while passing through the center of the dimple. In some embodiments, the dimple diameter $d$ is at least 0.1 cm and at most 5.0 cm, preferably is at least 0.2 cm and at most 3.0 cm; most preferably is at least 0.5 cm and at most 2.0 cm.

In some embodiments, at least a portion of the plurality of dimples has a common dimple depth and a common dimple diameter; in some embodiments every dimple in a plurality of dimples has a common dimple depth and a common dimple diameter. In some embodiments, at least a portion of the plurality of dimples has a common dimple depth but may have a different dimple diameter; in some embodiments every dimple in a plurality of dimples has a common dimple depth but at least a portion of the plurality of said dimples has a different dimple diameter. In some embodiments, at least a portion of the plurality of dimples has a common dimple diameter but may have a different dimple depth; in some embodiments every dimple in a plurality of dimples has a common dimple diameter but at least a portion of the plurality of said dimples has a different dimple depth. In some embodiments, at least a portion of the plurality of dimples has a different dimple depth and a different dimple diameter; in some embodiments every dimple in a plurality of dimples has a different dimple depth and a different dimple diameter.

In some embodiments, two or more portions of dimples forming a plurality of dimples have a common dimple depth and a common dimple diameter. Preferably, the two or more portions of dimples forming a plurality of dimples with a common dimple depth and a common dimple diameter are configured such that they are comprised in different areas of a reactor inner wall that would benefit from different dimple parameters. By implementing portions of dimples with different diameters and/or depths the proportions of the dimples may be adjusted to certain areas of the reactor; for instance certain hot-spots around reactor bends or curves where there is a higher rate of steam cracking, coke deposition, higher flow of molecules and/or pressure drops, may benefit more from deeper and/or wider dimples than areas close to the reactor exit where there is a lower rate. For example, shallow dimples, i.e., a dimple depth of 0.1 cm, may be situated in areas where the reactor forms a bend, while deeper dimples, i.e., a dimple depth of 0.3 cm, may be situated in areas where the reactor runs straight. For example, shallow dimples may be situated in the inlet tubes of the reactor (lower process temperatures, reduce pressure drop), while deeper dimples may be situated in hotspots or in the outlet tubes. This customization of dimple parameters may have advantages for run-lengths, selectivity, heat transfer, pressure drop, throughput and life cycle of the reactor.

In some embodiments, some dimples of the plurality of concave dimples are further characterized by a depth-to-diameter ratio (DDR), defined as DDR=dimple depth $e$/dimple diameter $d$; (or DDR=$e/d$).

In a further embodiment, each dimple forming a plurality of dimples is characterized by a DDR.

Preferably, the DDR is at least 0.01 and at most 0.5, preferably at least 0.05 and at most 0.3; more preferably at least 0.1 and at most 0.2; more preferably at least 0.15 and at most 0.25, for example about 0.20. In some embodiments, the DDR is at least 0.01 and at most 0.5, preferably at least 0.05 and at most 0.4; more preferably at least 0.1 and at most 0.3. Every portion of dimples from a plurality of dimples that share a common dimple depth and a common dimple diameter are hereby referred to as dimples with "common dimple DDR".

The magnitude of DDR for a dimple is related to a degree of concaveness of a dimples inner surface. The level of concaveness may have an influence of the interaction of a dimple with the molecules present in the inner segment of a reactor. The altering of the level of concaveness may have advantages for run-lengths, heat transfer, throughput of a reactor.

In some embodiments, the shape of one or more dimples is characterized by a geometrical feature; in a further embodiment the shape of each dimple of the plurality of dimples is characterized by a geometrical feature. Preferably, the geometrical features are further characterized by a non-linear edge, such as a smooth, rounded or curved edge, preferably as in at least a section of a sphere, spheroid, ovoid, or a teardrop shape or combination thereof. In some embodiments, at least a portion of dimples forming a plurality of dimples is characterized by a similar geometrical feature. In some embodiments, each dimple forming a plurality of dimples is characterized by a similar geometrical feature.

In some embodiments, the shape of the teardrop projected on an axial section can be characterized by the parametric equation $x(t)=a*\cos(t)$, $y(t)=b*\sin(t)\sin^m(t/2)$ with m at least 0.5 and at most 5. Other preferred shapes include the piriform curve $x(t)=a*(1+\sin(t))$, $y(t)=b*\cos(t)*(1+\sin(t))$; or the dumbbell curve $x(t)=a*t$, $y(t)=a*t^2*(1-t^2)^{\wedge}(-1/2)$.

In some preferred embodiments, two or more portions of dimples forming a plurality of dimples are characterized by a similar geometrical feature. Preferably, the two or more portions of dimples forming a plurality of dimples characterized by a similar geometrical feature are configured such that they are comprised in different areas of a reactor inner wall that would benefit from different dimple geometry. By implementing portions of dimples with different geometrical features the geometry of the dimples may be adjusted to certain areas of the reactor, for instance certain hot-spots around reactor bends or curves where there is a higher rate of steam cracking, coke deposition, higher flow of molecules and/or pressure drops, may require more spherical dimples than areas close to the reactor exit where there is a lower rate. For example, spherical dimples may be situated in areas where the reactor forms a bend, while teardrop or oval dimples may be situated in areas where the reactor runs straight. This customization of geometrical features may have advantages for run-lengths, heat transfer, throughput and life cycle of the reactor.

In some embodiments, one or more dimples, preferably one or more concave dimples, comprise two or more secondary curvature areas, wherein the secondary curvature areas have a different curvature radius than the one or more other concave dimples, wherein the secondary curvature areas are situated around or on the one or more concave dimples. In an exemplary embodiment additional protruding semicircles may surround the dimple, preferably these semicircles are aligned parallel to the dimple edges with their rounded edge convex to the gas flow. In another exemplary embodiment, an additional flat or convex area may be situated within the dimple, preferably not protruding outside of the surface area of the dimple.

The addition of two or more curvature areas around or inside the dimple may result in additional advantages for run-lengths, heat transfer, throughput of the reactor on top of the advantages reported for the implementation of a plurality of dimples without secondary curvature areas, for a similar pressure loss.

In some embodiments, at least a portion of a plurality of dimples is arranged in a pattern. In some embodiments, all of the dimples of a plurality of dimples are arranged in a pattern. In some embodiments, at least a portion of a plurality of dimples are arranged in two or more patterns. The application of multiple patterns may be limited to certain areas within the reactor, such as using a different patterns for the entry, the central area, or the exit of a reactor; or alternatively, on opposite sides within a reactor, for example during a bend or a twist of the reactor a pattern may be used on the long bend and another pattern may be used on the opposite short bend. In some embodiments, two or more patterns may be intermixed thereby forming new patterns designs. In some embodiments, patterns may also be used to guide the gas flow within the reactor tube, such as with linear patterns alongside a reactor wall.

Examples of suitable patterns include: a linear pattern, staggered, crossed, and so on. Certain patterns may have improved or decreased effects on heat transfer, pressure drops or deposition rates. The arrangement of dimples into patterns along the inner wall may result in additional advantages for run-lengths, selectivity, heat transfer, throughput of the reactor.

The portions of the reactor inner wall not covered by any dimple are from hereupon referred to as "smooth". In some embodiments, at least a portion of the inner wall is smooth. For certain regions within the reactor the addition of dimples may have little to no beneficial effects, such regions may show a low concentration of deposition precursors or deposition rate. The addition of dimples on these regions would only make a reactor more expensive, therefore the implementation of smooth regions may have advantages for the production and production costs. Additionally, certain regions of the reactor may suffer from a decreased structural integrity due to a thinning of the inner wall, therefore these regions may strategically be left smooth to decrease the chances of any reactor damage and increase the lifetime of said reactor.

In some embodiments, certain regions may be configured to be smooth to better implement certain advantages of dimples and dimple patterns. For example, certain flow directions may be redirected by using dimples in a pattern to divert flow from a certain reactor wall region and have it follow the direction of smooth regions. In some embodiments, certain area such as angles, bends or twists may require smooth areas to improve flow of process gas.

The term "area coverage" are used herein is the percentage of total area of the inner wall covered by dimples, defined as AC (%)=total area of the inner wall covered by dimples/total area of the inner wall*100. In some preferred embodiments, the AC is at least 1% and at most 99%, more preferably at least 20% and at most 90%. The AC may not necessarily be a critical design parameter but may be a result of the distances between subsequent dimples, related to the dimple diameter and pattern, and/or aforementioned designs of dimples and smooth areas depending on the reactor region, i.e., entry, exit, bends, twists, angles, etc.

In some embodiments, the reactor has a tubular shape with a certain reactor length, inner diameter, outer diameter and wall thickness. In a preferred embodiment for maximal product selectivity the tubular reactor has a linear shape. However, other embodiments exists as well such a tubular reactors with multiple passes connected by bends, twists, etc. for reasons of thermal efficiency and reactor life cycle.

The reactor may be characterized by a reactor length, preferably wherein the length is at least 10 m and at most 400 m, for example at most 100 m. The reactor may be further characterized by an inner diameter, corresponding with the diameter from two antipodal points along the inner wall of the reactor. The inner diameter is preferably at least 2 cm to at most 49 cm; more preferably at least 2.5 cm and at most 29 cm; most preferably at least 3 cm and at most 15 cm. The reactor may be further characterized by an outer diameter, corresponding with the diameter from two antipodal points along the outer wall of the reactor. The outer diameter is preferably at least 3 cm and at most 50 cm; more preferably at least 4 cm and at most 30 cm; most preferably at least 5 cm and at most 17 cm. The reactor may be further characterized by a wall thickness, corresponding to half the difference between the outer diameter and the inner diameter, wherein the wall thickness is preferably at least 0.3 cm and at most 2.0 cm; more preferably at least 0.4 cm and at most 1.5 cm; most preferably at least 0.5 cm and at most 1 cm. The length, inner and outer diameter, and by extension the wall thickness, may be adjusted for reasons of process optimization, run-length, selectivity and thermal efficiency.

In some embodiments, the inner wall is substantially thicker than the dimple depth e; otherwise structural and material integrity might be compromised resulting from the intense thermal energy present during a thermal cracking process.

A thicker reactor wall may result in lower thermal efficiency, and additionally, may be more expensive and difficult to produce, transport and install. Therefore an optimal design will seek to optimize the wall thickness to the maximal or average dimple depth.

The inventors have found that maintaining the minimal wall thickness constant with regards to the original design wall thickness, i.e. $t-e \approx t_0$, shows the best trade-off between structural integrity to thermal efficiency.

In some embodiments, a reactor inner wall may comprise a metal, a metal alloy, a ceramic, and/or a combination thereof. In a preferred embodiment, a reactor inner wall may comprise Ni—Cr—Fe—Al alloys, or ceramics.

In some embodiments, the inner wall may comprise additional post-fabrication treatments in the form of oxide layers of coatings in order to reduce the deposition of solid material on the inner wall and increase both the run length and the reactor life cycle. Barrier coating layers may contribute to the passivation of catalytic sites, reducing the catalytic deposition process. Catalytic coating layers may also contribute by gasifying already deposited layers. Alternatively, suitable coatings may also be procured from chemical companies such as BASF Qtech or GE (General Electric).

In some embodiments, the reactor inner wall comprises the same material as the reactor, the reactor wall, and/or the reactor outer wall.

In some embodiments, a dimple and/or the plurality of dimples may comprise a metal, a metal alloy, a ceramic, and/or a combination thereof. In some preferred embodiments, the plurality of dimples comprise the same material as the reactor; more preferably Ni—Cr—Fe—Al alloys, or ceramics.

Figure 1:
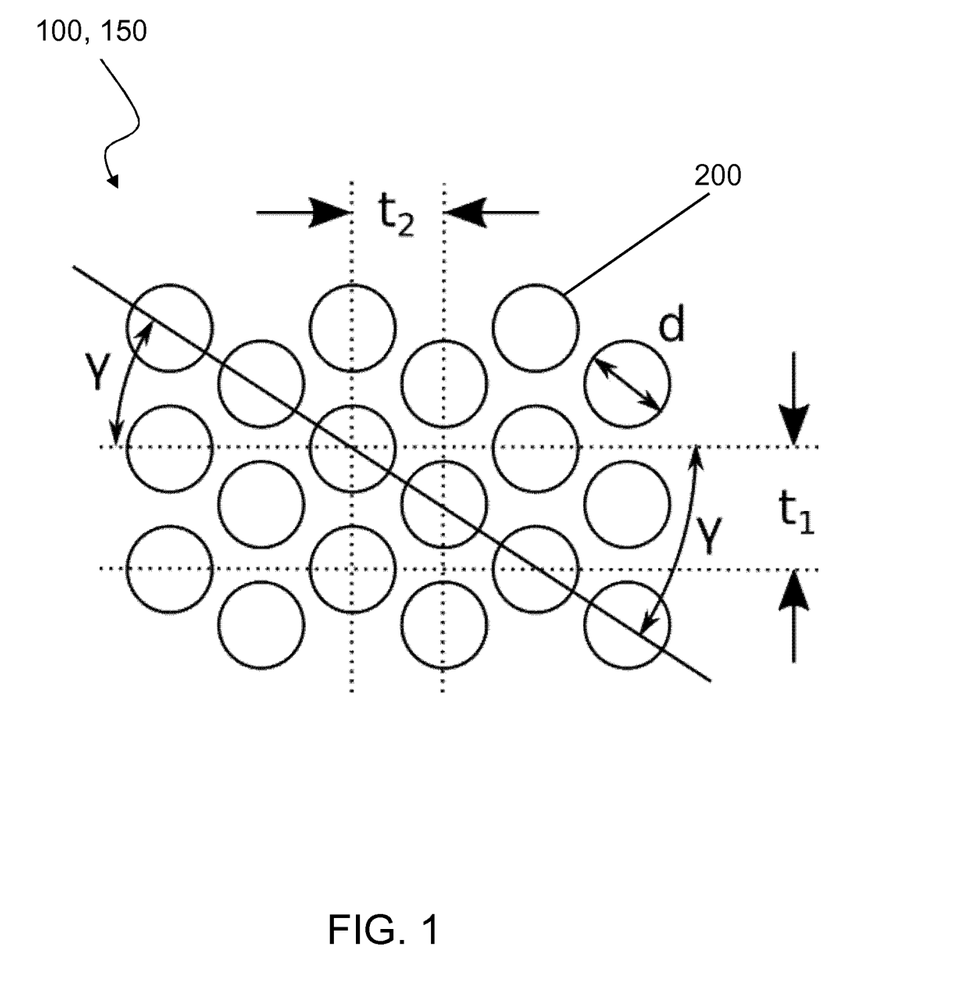
FIG. 1 is a development of the inner surface of a tube of the invention for illustrating an embodiment of a dimple arrangement formed on a reactor inner surface. In this figure parameter d refers to the dimple diameter (measured in the direction of the flow). $t_2$ is the distance between subsequent dimple rows in the direction of the flow, positioned at a staggering angle γ from each other. Parameter $t_1$ refers to the azimuthal distance between neighbouring dimples and can be calculated from the number of dimples per cross section n and the tube diameter D as πD/n.

In some preferred embodiments, the dimples are arranged in rows, preferably in a hexagonal pattern. The hexagonal pattern may be defined by the distance between two dimples $t_1$ within one row (shown in FIG. 1) or by the distance between staggered rows of dimples $t_2$ (shown in FIG. 1) In a particular embodiment parameter $t_1$ refers to the azimuthal distance between neighbouring dimples and can be calculated from the number of dimples per cross section n and the tube diameter D as $\pi D/n$; $t_2$ refers the distance between subsequent dimple rows in the direction of the flow, positioned at a staggering angle $\gamma$ from each other.

In some embodiments, the depth of the dimples e (shown in FIG. 2) is at least 0.5 mm, preferably at least 1.0 mm, preferably at least 1.5 mm, preferably at least 2.0 mm, for example at least 2.5 mm. In some embodiments, the diameter of the dimples d (shown in FIGS. 1, 2, and 3) is at least 5.0 mm, preferably at least 7.5 mm, preferably at least 10.0 mm, preferably at least 12.5 mm, for example at least 15.0 mm. In some embodiments, the distance t1 is at least 5.0 mm, preferably at least 10.0 mm, preferably at least 15.0 mm, preferably at least 20.0 mm, preferably at least 25.0 mm, for example at least 30.0 mm, for example at least 35.0 mm. In some embodiments, the number of dimples per cross section is at least 3, preferably at least 5, for example at least 8. In some embodiments, the distance $t_2$ is at least 5.0 mm and at most 30 mm, preferably at least 10.0 mm and at most 20 mm, for example about 15.0 mm. Such embodiments have an improved heat transfer characteristic.

In some embodiments, the depth of the dimples e (shown in FIG. 2) is at most 2.5 mm, preferably at most 2.0 mm, preferably at most 1.5 mm, preferably at most 1.0 mm, for example at most 0.5 mm. In some embodiments, the diameter of the dimples d (shown in FIGS. 1, 2, and 3) is at most 15.0 mm, preferably at most 12.5 mm, preferably at most 10.0 mm, preferably at most 7.5 mm, for example at most 5.0 mm. In some embodiments, the number of dimples per cross section is at most 64, preferably at most 16, for example at most 8. In some embodiments, the distance t1 is at most 35.0 mm, preferably at most 30.0 mm, preferably at most 25.0 mm, preferably at most 20.0 mm, preferably at most 15.0 mm, for example at most 10.0 mm, for example at most 5.0 mm. In some embodiments, the distance $t_2$ is at most 15.0 mm, preferably at most 10.0 mm, for example at most 5.0 mm. Such embodiments maintain a decent friction factor.

In some embodiments, the depth of the dimples e (shown in FIG. 2) is at least 1.0 mm, preferably at least 1.5 mm, preferably at least 2.0 mm, for example at least 2.5 mm. In some embodiments, the diameter of the dimples d (shown in FIGS. 1, 2, and 3) is at least 5.0 mm, preferably at least 7.5 mm, preferably at least 10.0 mm, preferably at least 12.5 mm, for example at least 15.0 mm. In some embodiments, the number of dimples per cross section is at least 3, preferably at least 5, for example at least 8. In some embodiments, the distance $t_2$ is at least 5.0 mm and at most 30 mm, preferably at least 10.0 mm and at most 20 mm, for example about 15.0 mm. In some embodiments, the distance t1 is at least 5.0 mm, preferably at least 10.0 mm, preferably at least 15.0 mm, preferably at least 20.0 mm, preferably at least 25.0 mm, for example at least 30.0 mm, for example at least 35.0 mm. In some embodiments, the dimples have an AC of at least 10% and at most 90%. In some embodiments, the dimples have an AC of at least 15% and at most 40%. In some embodiments, the dimples have an AC of at least 50% and at most 90%. Such embodiments have an improved thermal enhancement factor.

According to a second aspect, the invention relates to a furnace, comprising a reactor according to the first aspect, and preferred embodiments thereof. In some embodiments, one or more reactors comprising a plurality of dimples as described within the present invention on their respective inner wall are suspended in a common furnace.

By incorporating tens to hundreds of said reactors together in one furnace the production capacities may be increased up to several ten thousands kilotons per year (kta) while keeping the thermal costs, i.e., costs to heat up the reactors, sufficiently low to maintain a proper thermal efficiency. Large furnaces may be able to produce 500-700 tons of high value chemicals per day. The increased run lengths may result in an additional 10 to 30 production days per year by avoiding between 5 to 10 decoking cycles, corresponding with an additional production of 5 to 20 kta.

According to a third aspect, the invention relates to a method for producing a reactor according to the first aspect of the invention, and preferred embodiments thereof. In some embodiments, the plurality of dimples may be formed on the inner wall of a reactor by methods of:

moulding;
spuncasting;
excavation; and/or
deposition.

The production method of moulding may have benefits for production times as the reactor may be produced together with the dimples. In a first step a reactor may first be produced by casting the preferred material into a reactor mould comprising the inverted dimples, then in a next step the reactor may be folded to form a tubular shape characteristic of a tubular reactor used for thermal cracking.

The production method of spuncasting may have added benefits for production times as it allows the inner reactor to be formed separately in a rotating canister and be pressed against the outer wall of the canister by the centrifugal forces. This method is particularly effective in obtaining reactor with a low level of impurities, and hence better structural integrity.

The production method of excavation may have benefits for ease of production by allowing the reactor wall to be formed first, followed by an excavation of dimples using automated machinery. This method may be more suited for creating concave dimples.

The production method of deposition may allow the reactor wall to be formed separately from a layer comprising a plurality of concave dimples. The reactor wall and the separate layer could then be combined to form one structure, perhaps by means of thermal bonding. As a result the separate layer could form the inner wall of the reactor after bonding. This method may have benefits for ease and speed of production by allowing both structures to be produced simultaneously. In a preferred embodiment both the reactor and the separate layer comprise the same material as to prevent different rates of thermal expansion to jeopardize the structural integrity of the reactor tube during thermal cracking.

The choice between above described methods may be related to the choice of reactor materials (e.g. Ni—Cr—Fe—Al alloys, or ceramics). For example, the method of spuncasting is in particular well suited for producing metallic reactors but not for ceramic reactors. However, certain methods may require a combination of materials during the production process. For example, ceramic mold casting is a method which involves a group of metal casting processes that use a ceramics as the mold material.

The choice between above described methods may also be related to the desired reactor dimensions and structural properties. For example, the methods of spuncasting or moulding may be suited for producing reactors with a length of at least 10 m to at most 400 m; however, the method of excavation may be less suited for producing very long (>300 m) reactors due to increased production times.

According to a fourth aspect, the invention relates to a method for producing light olefins in a reactor according to the first aspect of the invention, and preferred embodiments thereof, or in a furnace according to the second aspect of the invention, and preferred embodiments thereof. Preferably, the method comprises the step of cracking the hydrocarbon feedstock into light olefins at a temperature of at least 700° C. and at most 900° C. By using higher temperatures selectivity towards lighter olefins can be obtained. Performing the method in the presence of steam at low pressures (approximately between 2 to 4 bar) further aids in reducing unwanted side reactions and improving product selectivity. Additional additives in the form of phosphorous, sulphur- or silicon-containing compounds can reduce this even further. More details on steam cracking conditions may be found in Zimmermann, H.; Walzl, R., Ethylene. In Ullmann's Encyclopedia of Industrial Chemistry, Wiley-VCH Verlag GmbH & Co. KGaA: 2000; pp 469-482, which is hereby incorporated in its entirety by reference.

In some embodiments, the method comprises a decoking step. Suitable decoking steps may be found in US20130239999A1 in paragraphs [0008] and [0009]. These paragraphs are hereby incorporated by reference. Suitable decoking steps may also be found in WO2016032730A, paragraph [0006]. This paragraph is hereby incorporated by reference. In some embodiments, the decoking step comprises the introduction of air into the reactor. In some embodiments, the decoking step comprises the introduction of steam into the reactor.

In some embodiments, the decoking step comprises the introduction of air and steam into the reactor.

In some embodiments, the method is for producing propylene.

Embodiments of the invention may allow the use of higher operating temperatures in order to increase reactor throughput or product selectivity. Increases in operating pressure are expected to remain minimal with careful selection of the design parameters with even the potential for a decrease in pressure at later stages in the run due to the decreased deposition rates.

EXAMPLES

Example 1: Properties and Dimensions of Dimples

Figure 2:
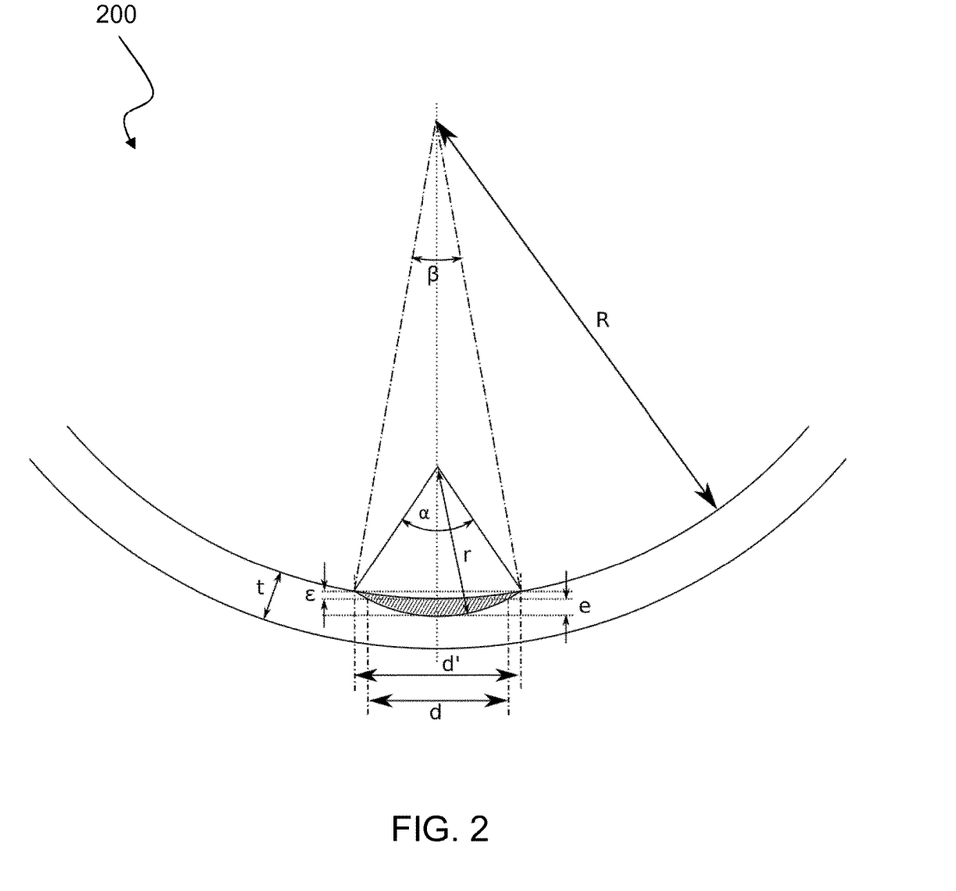
FIG. 2 is a view in cross-section of a dimple on a curved cylindrical surface for illustrating the different parameters of an individual dimple; described further in Example 1. In this drawing a tube with radius R and wall thickness t is shown on which a dimple with spherical shape and radius r is imprinted. The angles α and β correspond to the subtended angle of the dimple arc from respectively the dimple centre and the tube centre. Due to the curved surface of the cylindrical tube, the dimple diameter d in the streamwise direction is different from the apparent diameter d' in the azimuthal direction. Additionally, the apparent depth E+e may be larger than the true dimple depth e because of the curvature of the tube.
Figure 6:
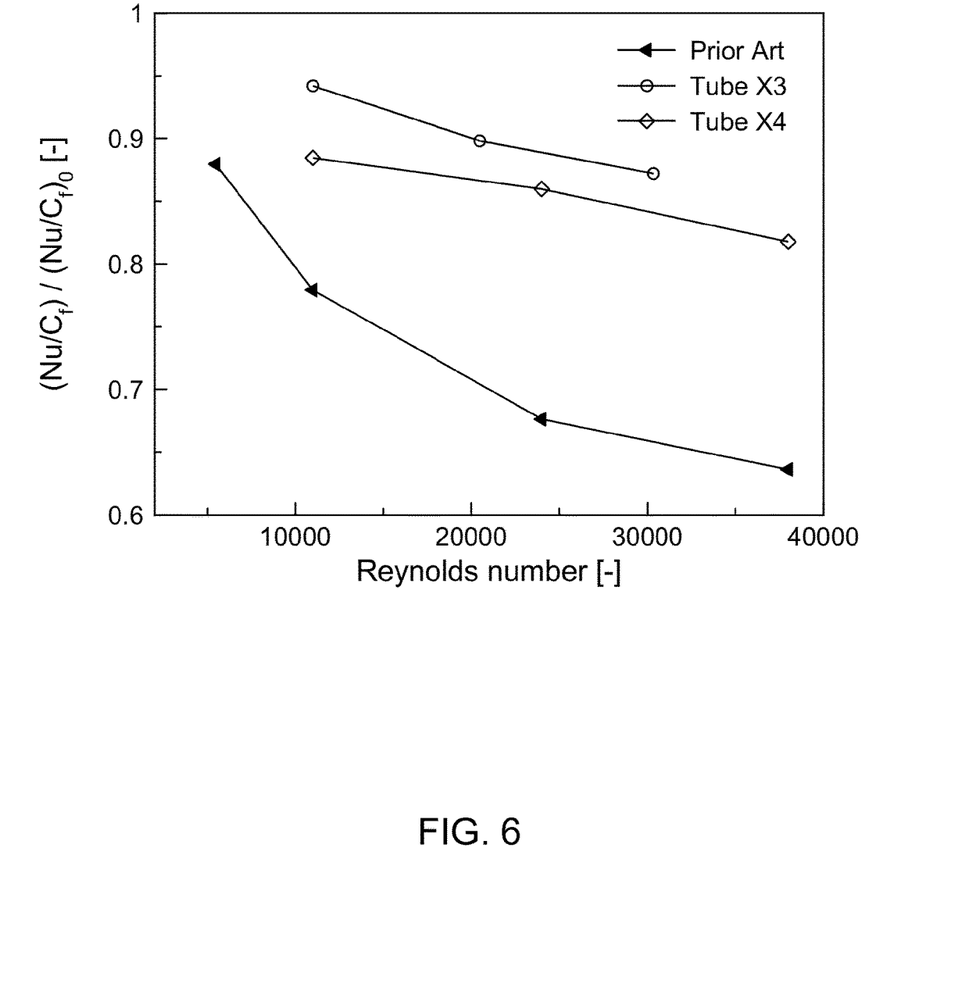
FIG. 6 is a graph showing the Reynolds number dependency for the relative heat transfer augmentation and pressure losses for two embodiments of the current invention, compared to a prior art tube; described further in Example 3.

To better illustrate the example, a reference is made to FIG. 2 and FIG. 3, which demonstrate the properties and dimensions of a dimple design. In particular, FIG. 6 depicts a cross-section of a dimple on a curved cylindrical surface; FIG. 3 illustrates the design of a dimple through application of three concentric curvature regions S1, S2 and S3 with respective curvature $1/r_1$, $-1/r_2$ and $-1/r_3$.

The radius (r) of the circle forming the spherical dimple (200) is calculated according to the theory of a circular segment $$r = \frac{e^2 + d^2/4}{2e}$$

The intersections in the tangential direction can be calculated by solving the system of equations consisting of respectively the spherical surface and the cylindrical tube:

$$(x-x_c)^2+(y-y_c)^2+(z-z_c)^2=r^2$$

$$x^2+y^2=R^2, \forall z$$

The following substitutions can be made in the cross-sectional plane without affecting generality of the solution:

$$x_c = R+e-r, \; y_c = 0, \; x = R\cos\frac{\beta}{2}, \; y = R\sin\frac{\beta}{2},$$

from which the angle β and width (d) of the dimple readily follow:

$$\Rightarrow \beta = 2\cos^{-1}\left(1 - \frac{er - e^2/2}{R^2 + eR - rR}\right)$$

$$d' = 2R\sin\frac{\beta}{2}$$

The percentage of the surface covered by dimples can be approximated by assuming the intersection to be an ellipse with major axis the circular arc on the cylindrical surface βR and minor axis the dimple diameter (d), multiplied by the number of dimples and divided by the unmodified cylindrical surface.

$$\text{Area Coverage}(AC)\ [\%] \cong \frac{100 * \text{Number of dimples} * \left(\frac{d\beta R}{4}\right)}{2LR}$$

Example 2: Exemplary Embodiments of Dimples

Figure 4:
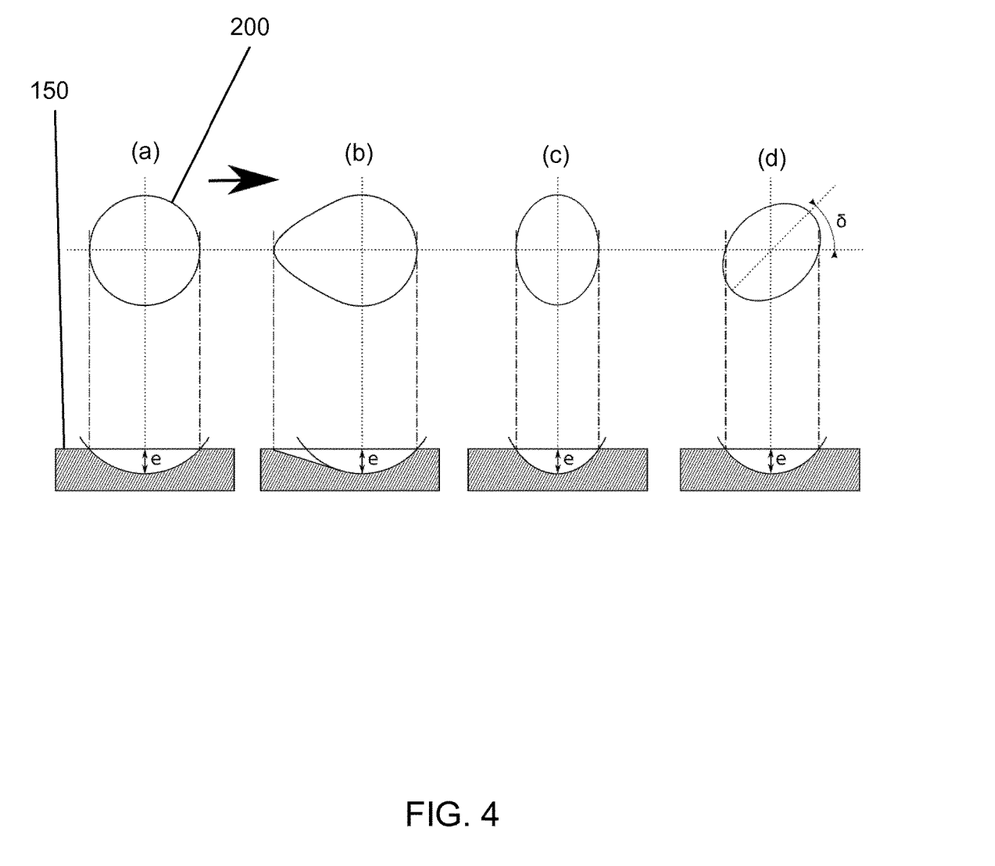
FIG. 4 is a development (top) and a radial section (bottom) of the inner surface of a tube of the invention for illustrating different dimple shapes, including spherical (a), teardrop (b), spheroid (c) and inclined (d) spheroid dimple designs. For the inclined spheroid dimple the angle δ is defined as the angle between the flow direction and the major axis of the spheroid.

For an exemplary embodiment according to the present invention of a dimple design a reference is made to FIG. 4, which depicts a development (top view) and a radial section (bottom view) of the inner surface of a reactor inner wall of four dimple shapes, including spherical (a), teardrop (b), spheroid (c) and inclined (d) spheroid dimple designs.

Table 1. presents an overview of the main physical properties of tested dimple designs. The 'Prior Art' tube in Table 1 comprises a spiral ribbed tube, in which the rib is of semi-circular convex shape with a maximal height of 0.04 relative to the tube diameter and in which the rib is further attached to the tube inner surface at an angle of 65° to the axial flow direction, similar to the 'heat exchange tube' technology of Kubota (as described in U.S. Pat. No. 5,950, 718, also labeled as 'Prior Art 1'), which seeks to periodically break the laminar flow by the presence of inwardly oriented helical fins.

Example 3: Results of Tested Dimple Designs

Figure 5:
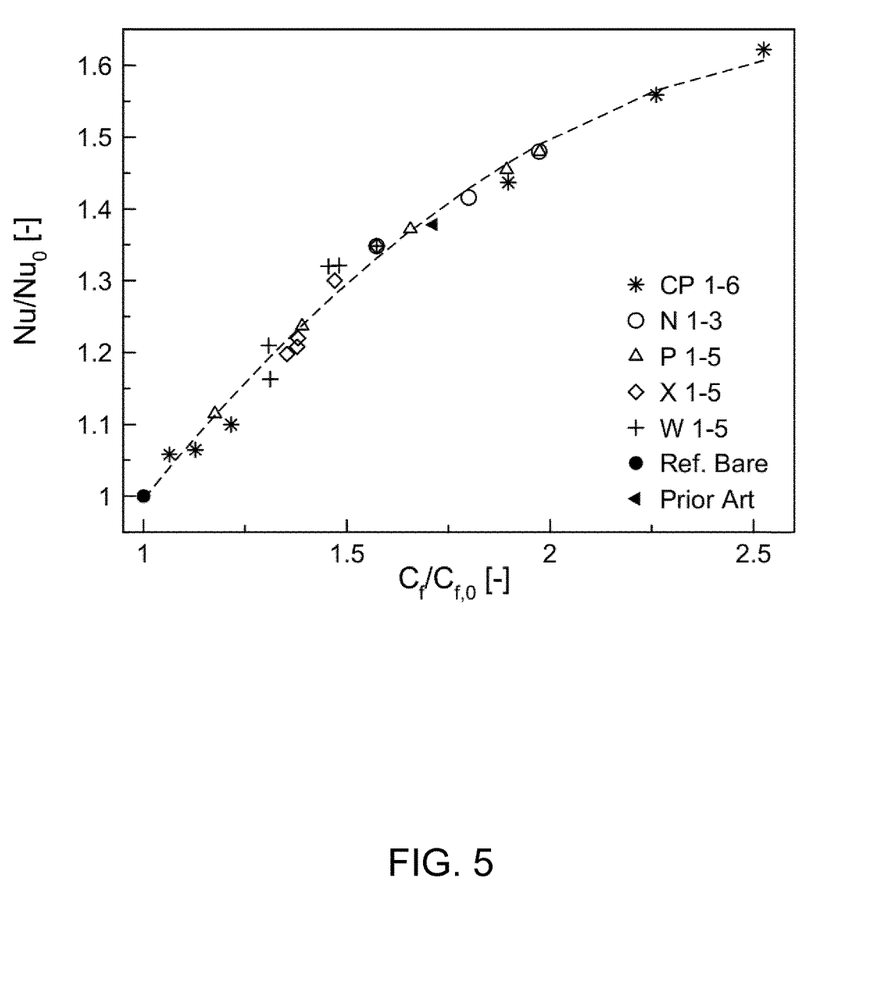
FIG. 5 is a graph showing pressure loss and heat transfer augmentation compared to a reference bare tube for a variety of dimple parameter combinations and a prior art tube; described further in Example 2.

The various dimple designs presented in Example 2, cfr. Table 1, were tested at a Reynolds number (Re) of 11,000 for heat transfer and friction characteristics and the results are set out in Table 2, below. To better illustrate the results, FIG. 5 depicts a graph showing pressure loss and heat transfer augmentation compared to a reference tube (i.e., a bare tube without dimples) and prior art. Additionally, FIG. 6 illustrates the Re dependency for the relative heat transfer augmentation and pressure losses for two embodiments of the current invention, compared to prior art, as described in Example 2 The reduced sensitivity to Re may yield optimal performance over a wider range of flow conditions than the prior art, especially in the higher segment of Reynolds numbers.

$Nu/Nu_0$ is a heat transfer enhancement characteristic, $C_f/C_{f,0}$ is a friction enhancement factor, and $(Nu/Nu_0)/(C_f/C_{f,0})^{1/3}$ is a thermal enhancement factor of the augmented surface at equal pumping power.

TABLE 2

Results of the tested dimple designs.

| Test Tubes No. | Re = 11,000 | | |
|---|---|---|---|
| | $Nu/Nu_0$ | $C_f/C_{f,0}$ | $(Nu/Nu_0)/(C_f/C_{f,0})^{1/3}$ |
| CP1 | 1.06 | 1.06 | 1.04 |
| CP2 | 1.06 | 1.13 | 1.02 |
| CP3 | 1.10 | 1.22 | 1.03 |

TABLE 1

Properties of the tested dimple designs.

| Test Tubes No. | I.D. [mm] | Shape | e [mm] | d [mm] | # [—] | γ [°] | t1 [mm] | t2 [mm] | AC [%] |
|---|---|---|---|---|---|---|---|---|---|
| CP1 | 50 | Sphere | 0.2 | 4 | 32 | 30 | 4.9 | 4 | 80.3 |
| CP2 | 50 | Sphere | 0.4 | 4 | 32 | 30 | 4.9 | 4 | 75.4 |
| CP3 | 50 | Sphere | 0.75 | 7.5 | 16 | 11.25 | 9.8 | 7.5 | 75.1 |
| CP4 | 50 | Sphere | 1.5 | 15 | 8 | 22.5 | 19.6 | 15 | 90.4 |
| CP5 | 50 | Sphere | 2.25 | 15 | 8 | 22.5 | 19.6 | 15 | 80.0 |
| CP6 | 50 | Sphere | 3.0 | 15 | 8 | 22.5 | 19.6 | 15 | 71.7 |
| N1/P1 | 50 | Sphere | 1.5 | 15 | 8 | 0 | 19.6 | 15 | 90.2 |
| N2 | 50 | Sphere | 1.5 | 15 | 6 | 0 | 26.2 | 15 | 82.5 |
| N3/X1/W5 | 50 | Sphere | 1.5 | 15 | 4 | 0 | 39.3 | 15 | 56.9 |
| P2 | 50 | Sphere | 1.5 | 15 | 8 | 0 | 19.6 | 16 | 85.3 |
| P3 | 50 | Sphere | 1.5 | 15 | 8 | 0 | 19.6 | 20 | 67.6 |
| P4 | 50 | Sphere | 1.5 | 15 | 8 | 0 | 19.6 | 30 | 45.1 |
| P5 | 50 | Sphere | 1.5 | 15 | 8 | 0 | 19.6 | 60 | 22.5 |
| X2 | 50 | Sphere | 1.5 | 15 | 4 | 30 | 39.3 | 15 | 56.9 |
| X3 | 50 | Sphere | 1.5 | 15 | 4 | 45 | 39.3 | 15 | 56.9 |
| X4 | 50 | Sphere | 2.5 | 15 | 6 | 0 | 26.2 | 30 | 29.6 |
| X5 | 50 | Sphere | 2.5 | 15 | 6 | 45 | 26.2 | 30 | 29.6 |
| W1 | 50 | Sphere | 1.5 | 5 | 4 | 0 | 39.3 | 5 | 10.3 |
| W2 | 50 | Sphere | 1.5 | 8 | 4 | 0 | 39.3 | 8 | 17.6 |
| W3 | 50 | Sphere | 1.5 | 10 | 4 | 0 | 39.3 | 10 | 23.4 |
| W4 | 50 | Sphere | 1.5 | 12 | 4 | 0 | 39.3 | 12 | 31.8 |
| R1 | 30.2 | Sphere | 0.9 | 6 | 8 | 45 | 11.9 | 4.1 | 65.8 |
| R2 | 30.2 | Sphere | 1.9 | 7.5 | 8 | 0 | 11.9 | 12.5 | 39.4 |
| R3 | 30.2 | Sphere | 3.9 | 8.5 | 4 | 0 | 23.7 | 12.5 | 31.9 |
| Ref | 50 | — | — | — | — | — | — | — | 0.0 |
| Prior Art 1 | 50 | Spiral convex rib | 2 | 11.2 | — | 64.5 | — | 75 | 15.0 |
| Prior Art 2 | 30.2 | Longitudinal rounded fin | 3.6 | — | 8 | 0 | — | — | 100 |
| Prior Art 3 | 30.2 | Perpendicular convex rib | 1 | 3 | — | 90 | — | 24 | 12.5 |

TABLE 2-continued

Results of the tested dimple designs.

| Test Tubes No. | Re = 11,000 | | |
|---|---|---|---|
| | $Nu/Nu_0$ | $C_f/C_{f,0}$ | $(Nu/Nu_0)/(C_f/C_{f,0})^{1/3}$ |
| CP4 | 1.44 | 1.90 | 1.16 |
| CP5 | 1.56 | 2.26 | 1.19 |
| CP6 | 1.62 | 2.53 | 1.19 |
| N1/P1 | 1.35 | 1.57 | 1.16 |
| N2 | 1.42 | 1.80 | 1.16 |
| N3/X1/W5 | 1.48 | 1.97 | 1.18 |
| P2 | 1.46 | 1.89 | 1.18 |
| P3 | 1.37 | 1.66 | 1.16 |
| P4 | 1.24 | 1.39 | 1.11 |
| P5 | 1.12 | 1.18 | 1.06 |
| X2 | 1.21 | 1.38 | 1.09 |
| X3 | 1.20 | 1.35 | 1.08 |
| X4 | 1.30 | 1.47 | 1.14 |
| X5 | 1.22 | 1.38 | 1.10 |
| W1 | 1.16 | 1.31 | 1.06 |
| W2 | 1.21 | 1.31 | 1.11 |
| W3 | 1.32 | 1.46 | 1.16 |
| W4 | 1.32 | 1.48 | 1.16 |
| Ref | 1.00 | 1.00 | 1.00 |
| Prior Art 1 | 1.38 | 1.71 | 1.15 |

Example 4: Impact on Olefin Yields in a Steam Cracker

Reactive CFD simulations were performed for a set of different dimple configurations, along with configurations according to the existing prior art. The geometries R1, R2, R3 were compared with a traditional bare tubular reactor, as well as a longitudinally finned reactor (as described in GB Patent 969796, also labelled as 'Prior Art 2') and a reactor with a convex rib applied perpendicular to the flow direction (similar to the design in U.S. Pat. No. 5,950,718, also labelled as 'Prior Art 3'). The parameters of these designs are listed in Table 1.

Simulations were performed using the open-source CFD package OpenFOAM, using a well-validated kω-SST turbulence model and a free-radical reaction network suited for propane cracking. The simulated industrial geometry is of the single-pass Millisecond type, with a reactor diameter of 30.2 mm and length of 10.56 m.

Table 3 lists the obtained results, indicating the advantages over using the prior art. It is clear that the positive effect on tube metal temperatures and coking rates can be achieved at a much lower penalty in pressure losses than for the ribbed design. While the finned design provides good heat transfer, the increased exposed surface area causes the fouling rate to be almost equal to the reference geometry. Additionally, yields are lost because of the large zone of high temperatures in between the fins, where unwanted side reactions occur.

TABLE 3

Results of the tested dimple designs.

| | Ref | R1 | R2 | R3 | Prior art 2 | Prior art 3 |
|---|---|---|---|---|---|---|
| ΔP [%] | — | +87 | +59 | +261 | +29 | +297 |
| $\Delta T_{wall, max}$ [K] | — | −45 | −35 | −41 | −27 | −53 |
| $\Delta r_{cokes, max}$ [%] | — | −39 | −30 | −31 | −6 | −50 |
| Conversion [%] | 75 | 75 | 75 | 75 | 75 | 75 |
| $C_2H_4 + C_3H_6$ yield [%] | 50.53 | 50.70 | 50.60 | 50.65 | 50.37 | 50.73 |

Example 5: Self-Cleaning Effect of the Dimpled Designs

Figure 7A:
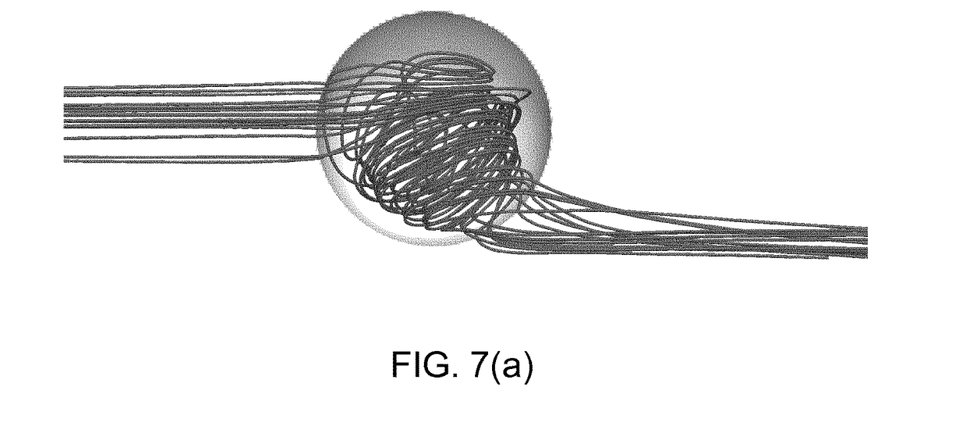

During large eddy simulations (LES) of flow over a single dimple, it was observed that a flow pattern emerges that causes the fluid to exit the dimples at an angle of 45° to the mean flow, enhancing the tangential mixing in the tube (FIG. 7(a)). More importantly, this phenomenon is unstable but self-sustained, causing it to automatically switch flow direction with a certain frequency. The oscillatory behaviour occurs on a time scale that is in between the time scale of flow through the reactor (ms) and that of coke formation (hours). Because of this, it is expected that small particles of cokes can be spalled off continuously, in this manner achieving a sort of "self-cleaning" effect of the surface. This behaviour will be desirable in the process of coke removal, as more spalling will allow a faster return to operation and reduced downtime. Increased spalling during operation can also be desirable, provided that the downstream equipment can handle the fragments of spalled coke. If this is the case, substantially increased time can pass between reactor decokings and productivity will be improved.

Figure 7B:
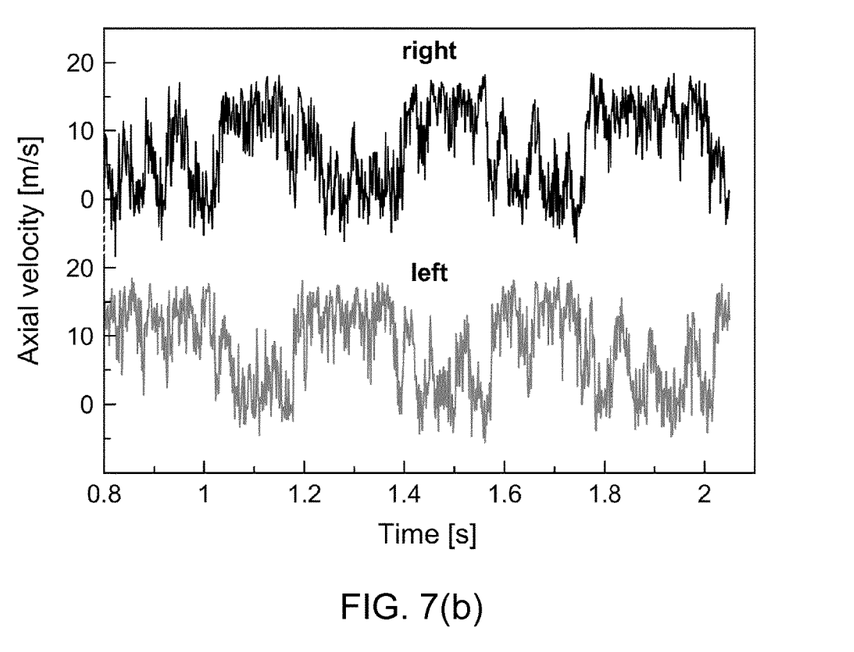
FIG. 7(b) is a graph showing the instantaneous streamwise velocity at locations "left" and "right", as indicated on FIG. 7(a); described further in Example 5.

Simulations were performed using a large eddy simulation framework where identical time-dependent inlet conditions were applied to three simulations with varying dimple depth-to-diameter ratios (DDR). Flow over a single dimple with fixed diameter was considered, in a channel of height h/d=0.33. The time-dependent velocities were monitored at both the left and right trailing edges of the concave dimple, at a relative angle of 45° with the mean flow, as illustrated in FIG. 7(a), along with a graphical representation of the flow, time-averaged over a period shorter than the time scale of the oscillations. FIG. 7(b) shows the instantaneous velocities for the highest DDR ratio, clearly illustrating the shifting direction of the fluid ejected from the dimple. Table 4 lists the quantitative results for the four tested designs, obtained at an equal Reynolds number of 20,000. With increasing DDR, a positive impact on both the frequency and the amplitude of the oscillatory flows can be seen. For the most shallow dimple configurations, the flow still exits the dimple tangentially but remains symmetrical at all times and no large-scale oscillations were seen.

TABLE 4

Self-cleaning effect of the tested dimple designs.

| | Frequency [1/s] | Amplitude-to-mean-velocity ratio [—] |
|---|---|---|
| DDR = 0.26 | 1.9 | 0.34 |
| DDR = 0.45 | 4.5 | 0.53 |

Furthermore, the flow switches directions between left and right, at a specific frequency. Such switching improves heat transfer and removes fouling. Deep dimples have larger oscillations at a higher frequency.

FIG. 7 illustrates this switching for a depth-to-diameter ratio DDR of 0.26 at a frequency of 2 Hz.

The invention claimed is:

1. A pyrolysis, thermal cracking, or steam cracking reactor for cracking hydrocarbons wherein the reactor has an inner wall; characterized in that the inner wall comprises a plurality of concave dimples embedded in a surface of said inner wall, characterized by an area coverage (AC) defined as AC (%)=total area of the inner wall covered by dimples/total area of the inner wall*100;

wherein the AC is at least 20% and at most 90%; and, wherein each concave dimple of the plurality of concave dimples is characterized by a dimple diameter d, wherein d is at least 0.1 cm and at most 5.0 cm.

2. The reactor according to claim 1, wherein the reactor is a steam cracking reactor.

3. The reactor according to claim 1, wherein each concave dimple of the plurality of concave dimples is characterized by a dimple depth e, wherein e is at least 0.01 cm and at most 1.0 cm.

4. The reactor according to claim 1, wherein each concave dimple of the plurality of concave dimples is characterized by a dimple diameter d, wherein d is at least 0.5 cm and at most 2.0 cm.

5. The reactor according to claim 3, wherein each concave dimple of the plurality of concave dimples is further characterized by a depth-to-diameter ratio (DDR), defined as DDR=$e/d$;

wherein the DDR is at least 0.01 and at most 0.5.

6. The reactor according to claim 1, wherein the shape of each dimple of the plurality of concave dimples is characterized by a geometrical feature of a smooth or curved edge.

7. The reactor according to claim 6, wherein at least one dimple of the plurality of dimples further comprises two or more secondary curvature areas of a different curvature radius than the main concavity, wherein the secondary curvature areas are situated on the edge of, or within the main concavity.

8. The reactor according to claim 1, wherein at least a portion of the plurality of concave dimples is arranged in one or more patterns.

9. The reactor according claim 1, wherein the AC is at least 50% and at most 90%.

10. The reactor according claim 1, wherein the reactor has a tubular shape and is characterized by:
a total reactor length of at least 10 m to at most 400 m;
an inner diameter of at least 2 cm to at most 20 cm;
an outer diameter, larger than the inner diameter, of at least 3.0 cm and at most 22.0 cm; and
a wall thickness, defined as half the difference between the outer diameter and the inner diameter, of at least 0.3 cm and at most 2.0 cm.

11. The reactor according to claim 10, wherein the wall thickness is greater than twice the dimple depth e.

12. The reactor according to claim 1, wherein the inner wall comprises a metal, a metal alloy, a ceramic, and/or a combination thereof.

13. The reactor according to claim 12, wherein each dimple of the plurality of concave dimples comprises the same material as the reactor.

14. A furnace, comprising one or more reactors according to claim 1.

15. A method for producing light olefins in a reactor according to claim 1, the method comprising the step of cracking a hydrocarbon feedstock into light olefins at a temperature of at least 700° C. and at most 900° C.

16. A method for producing light olefins in a furnace according to claim 14, the method comprising the step of cracking a hydrocarbon feedstock into light olefins at a temperature of at least 700° C. and at most 900° C.

17. The reactor according to claim 2, wherein each concave dimple of the plurality of concave dimples is characterized by a dimple depth e, wherein e is at least 0.1 cm and at most 1 0.5 cm.

18. The reactor according to claim 3, wherein each concave dimple of the plurality of concave dimples is further characterized by a depth-to-diameter ratio (DDR), defined as DDR=$e/d$;

wherein the DDR is at 0.1 and at most 0.3.

19. The reactor according to claim 1, wherein the shape of each dimple of the plurality of concave dimples is characterized by a geometrical feature of at least a section of a sphere, a spheroid, an ovoid, or a teardrop shape.

20. The reactor according to claim 1, wherein at least a portion of the plurality of concave dimples is arranged in one or more patterns and wherein the pattern is linear, staggered, and/or crossed, and wherein the reactor has a tubular shape and is characterized by:
a total reactor length of at least 10 m to at most 400 m;
an inner diameter of at least 3 cm and at most 15 cm;
an outer diameter, larger than the inner diameter, of at least 5.0 cm and at most 17.0 cm; and
a wall thickness, defined as half the difference between the outer diameter and the inner diameter, of at least 0.5 cm and at most 1 cm and
wherein the wall thickness is greater than 3*e.

* * * * *